(12) United States Patent
Reinecke et al.

(10) Patent No.: US 10,331,528 B2
(45) Date of Patent: Jun. 25, 2019

(54) RECOVERY SERVICES FOR COMPUTING SYSTEMS

(71) Applicant: HEWLETT PACKARD ENTERPRISE DEVELOPMENT LP, Houston, TX (US)

(72) Inventors: Kate Elizabeth Reinecke, Bristol (GB); Philipp Reinecke, Bristol (GB); Stephen James Crane, Bristol (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 163 days.

(21) Appl. No.: 15/447,417

(22) Filed: Mar. 2, 2017

(65) Prior Publication Data
US 2018/0253362 A1   Sep. 6, 2018

(51) Int. Cl.
G06F 11/00     (2006.01)
G06F 11/14     (2006.01)
G06F 11/07     (2006.01)
G06F 9/455     (2018.01)

(52) U.S. Cl.
CPC ...... *G06F 11/1471* (2013.01); *G06F 9/45558* (2013.01); *G06F 11/0793* (2013.01); *G06F 11/1438* (2013.01); *G06F 11/1458* (2013.01); G06F 2009/45575 (2013.01); G06F 2009/45587 (2013.01); G06F 2201/805 (2013.01); G06F 2201/815 (2013.01)

(58) Field of Classification Search
CPC ............ G06F 11/0793; G06F 11/1438; G06F 11/1458; G06F 11/1471
See application file for complete search history.

(56) References Cited

U.S. PATENT DOCUMENTS

| | | |
|---|---|---|
| 7,447,850 B1 | 11/2008 | Del et al. |
| 7,702,868 B1 | 4/2010 | Hardman |
| 8,666,938 B1 | 3/2014 | Pancholy |
| 8,682,862 B2 | 3/2014 | Rosikiewicz et al. |
| 8,826,077 B2 | 9/2014 | Bobak et al. |
| 9,218,254 B2 | 12/2015 | Locasto et al. |
| 9,430,333 B2 | 8/2016 | D'Amato et al. |
| 9,459,974 B2 | 10/2016 | He et al. |
| 9,971,655 B1 * | 5/2018 | Li ................... G06F 11/1451 |

(Continued)

OTHER PUBLICATIONS

"Storage Integrated Data Protection," Aug. 2016, pp. 1-4, Brochure, Hewlett Packard Enterprise Development LP, Available at: <h20195.www2.hpe.com/V2/getpdf.aspx/4AA5-5173ENW.pdf?ver=Rev%203>.

(Continued)

*Primary Examiner* — Charles Ehne
(74) *Attorney, Agent, or Firm* — Hewlett Packard Enterprise Patent Department

(57) ABSTRACT

Example implementations relate to capturing and/or recovering components of a computing system. A recovery service may receive a recovery script from an external recovery script repository, wherein the recovery script may include a number of actions, each respective action being a capture action or a recovery action. For action in the recovery script, the recovery service may request a recovery agent to perform the action on a component of the computing system.

19 Claims, 9 Drawing Sheets

(56) References Cited

U.S. PATENT DOCUMENTS

| | | | |
|---|---|---|---|
| 2001/0037475 A1* | 11/2001 | Bradshaw | G06F 8/71 |
| | | | 714/15 |
| 2007/0250930 A1* | 10/2007 | Aziz | G06F 21/554 |
| | | | 726/24 |
| 2008/0005782 A1* | 1/2008 | Aziz | G06F 9/45537 |
| | | | 726/3 |
| 2008/0276123 A1 | 11/2008 | Sudhakar et al. | |
| 2011/0071981 A1* | 3/2011 | Ghosh | G06F 11/2025 |
| | | | 707/634 |
| 2012/0185913 A1 | 7/2012 | Martinez et al. | |
| 2014/0258238 A1 | 9/2014 | Jin et al. | |
| 2014/0281709 A1 | 9/2014 | D'Amato et al. | |
| 2015/0163088 A1 | 6/2015 | Anschutz | |
| 2016/0283281 A1 | 9/2016 | Antony | |
| 2018/0211042 A1* | 7/2018 | Reinecke | G06F 21/568 |

OTHER PUBLICATIONS

David Vossel, "Pacemaker Remote: Scaling High Availability Clusters," 2016, pp. 1-46, Edition 7, Available at: <clusterlabs.org/doc/en-US/Pacemaker/1.1-pcs/pdf/Pacemaker_Remote/Pacemaker-1.1-Pacemaker_Remote-en-US.pdf>.

Kevin Hooke, "Snapshot a Running Docket-Machine on Virtual-Box?," Nov. 12, 2015, 1-page, Available at: <superuser.com/questions/999664/snapshot-a-running-docker-machine-on-virtualbox>.

European Search Report and Search Opinion Received for EP Application No. 18159058.9, dated Jul. 26, 2018, 9 pages.

* cited by examiner

RECOVERY SERVICES FOR COMPUTING SYSTEMS

BACKGROUND

A computing system may employ various levels and layers of abstraction. For example, a computing system may be a physical system that includes a processing resource and memory. The physical system may employ an operating system having a hypervisor installed, the hypervisor may run virtual machines, a virtual machine may have a container engine installed, and the container engine may run a number of containerized applications.

BRIEF DESCRIPTION OF THE DRAWINGS

Various examples will be described below with reference to the following figures.

DETAILED DESCRIPTION

Figure 1A:
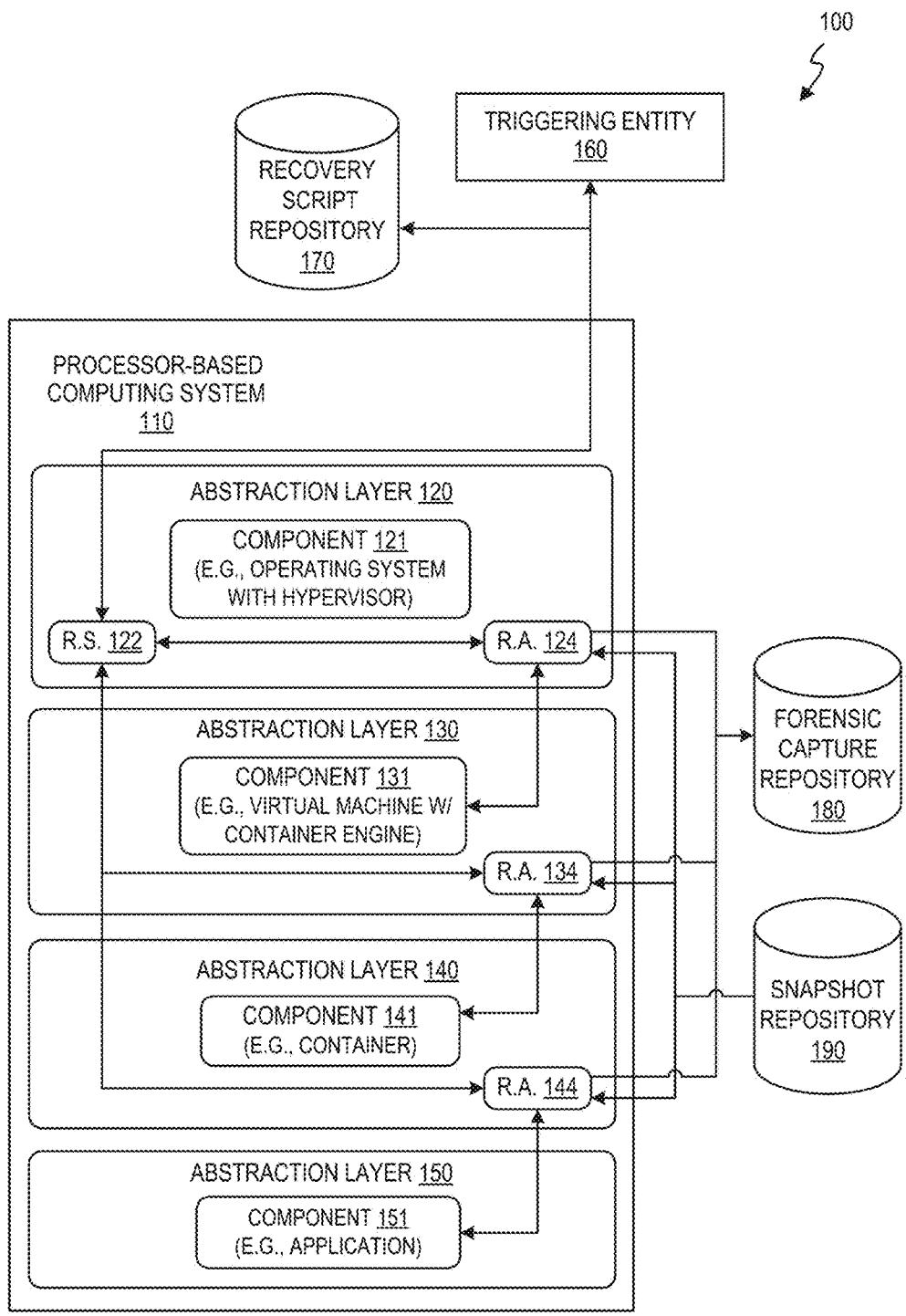
FIG. 1A is a block diagram depicting an example computing environment that includes a recovery service and recovery agents.

For simplicity and illustrative purposes, the present disclosure is described by referring mainly to examples thereof. As used herein, the term "includes" means includes but not limited to, the term "including" means including but not limited to. The term "comprises" means includes but not limited to, the term "comprising" means including but not limited to. The term "based on" means based at least in part on. The term "number" means any natural number equal to or greater than one. The terms "a" and "an" are intended to denote at least one of a particular element. The term "A and/or B" is intended to include the following possibilities: A but not B, B but not A, or both A and B.

As described above, a computing system may employ various layers of abstraction. These layers may be interacting and interdependent, and also host components (e.g., processor-executed programs and software) of the computing system. For example, a computing system may be a physical system having processing resource(s) and memory. The physical system may employ an operating system having a hypervisor installed, the hypervisor may run a virtual machine (VM), the VM may have a container engine installed, and the container engine may run a containerized application. In such an example, the operating system, the VM, the container, and the application may each be abstraction layers. Other types of abstraction layers not described above also may be employed. Various example computing systems may employ different numbers or combinations of such abstraction layers.

However, a computing system and any or all of the abstraction layers may be subject to system errors and security threats. For example an operating system, virtual machine, container or application may crash due to an error or unexpected condition, or may succumb to a security threat, such as malware. In response to detection of a system error or security threat, the computing system may be shut down. An attempt may then be made to recover or restore the computing system to a known good state. However, shutting down and recovering the entire computer system may be very disruptive and time consuming, especially if the error or threat was confined to a discrete component such as an application, container or virtual machine. Further, by shutting down the computer system in haste to resolve the system error or threat, valuable diagnostic information be lost.

Accordingly, it may be useful to capture forensic diagnostic information before recovering the computer system. Further, it may be useful to capture and/or recover a component of the computing system which has been compromised without disrupting operation of the entire computing system.

One aspect of the present disclosure proposes a computing system comprising a plurality of abstraction layers, each layer including a number of components. A plurality of recovery agents are installed on the computing system, each recovery agent installed in a respective abstraction layer and associated with a component in a lower abstraction layer. A recovery service is to receive a recovery script from an external recovery script repository. The recovery script may include a number of actions, each respective action being a capture action to send a snapshot of a target component to an external forensic capture repository or a recovery action to return a target component to a known good state. For each action in the recovery script, the recovery service is to determine a recovery agent which is able to perform the action on the target component and forward the action to the determined recovery agent.

As the recovery script is stored in an external recovery script repository, the recovery script may be protected from system errors or system threats occurring at the computing system. Furthermore, the system may be flexible and simple to update, as the recovery script may be changed or updated without changing the recovery service or recovery agents. As there are a plurality of recovery agents, each associated with a component in a lower abstraction layer, the above arrangement may allow individual components to be captured and recovered. This may minimize disruption to operation of the computing system. Further, as the capture data may be component specific, this may make diagnosis easier as the capture data may be specific to a component which was compromised.

In some examples, the use of a recovery script, recovery service and recovery agents may facilitate automated capture and/or recovery of components of a complex computing system, where the components are installed at different levels of abstraction of a computing system. Such an automated system may be convenient and reliable.

Referring now to the figures, FIG. 1A is a block diagram depicting an example computing environment 100 that includes a processor-based computing system 110 and a plurality of repositories external to the computing system including a recovery script repository 170, a forensic capture repository 180 and a snapshot repository 190. The computing system 110 includes a plurality of abstraction layers, each of which includes a number of components such as an operating system, virtual machines, containers and applications etc.

The computing environment also includes a plurality of recovery agents 124, 134, 144 installed in the various abstraction layers of the computing system 110 and a recovery service 122. The recovery service 122 is to receive a recovery script from the external recovery script depository 170 and process the recovery script to request at least some of the recovery agents 124, 134, 144 to perform capture and/or recover actions on components of the processor-based computing system 110. For each action, the recovery service may determine a recovery agent which can perform the action on the target component and request the determined recovery agent to perform the action (e.g. by directly or indirectly forwarding the action to the determined recovery agent).

Examples of a capture action may include capturing a snapshot of a target component, such as a filesystem snapshot, a memory snapshot, a snapshot of configuration parameters, etc. and sending the captured data to the forensic capture repository 180. In this way the capture action may capture diagnostic information relating to the component. The snapshot may be used for future diagnosis of a system error or threat which triggered deployment of the recovery script.

A recovery action is an action that returns the component to a known good state. A known good state may be a state in which the component is operating correctly and in which the component is not infected with malware. In some examples, the known good state may be retrieved from the snapshot repository 190. In one example, each recovery agent is to perform a recovery action selected from the list comprising: returning an application to a pre-defined state, rebooting or re-imaging a virtual machine, hypervisor, operating system or container or rolling an operating system, hypervisor, virtual machine or container backward to a known good state or forward to a patched known good state.

Rolling forward may include replacing the component with a later version of the component and/or installing patches to place the component in a known good state. Replacing a component may involve re-imaging, i.e. writing an image of a replacement component to disk. This is in contrast to re-booting, which involves re-starting a component based on the current disk image.

The various parts of the computing environment 100 of FIG. 1A will now be described in further detail.

The computing system 110 may employ hardware devices (e.g., electronic circuitry or logic) or any combination of hardware and programming to implement various functionalities described herein. For example, programming may include executable instructions stored on a non-transitory machine readable medium, such as random access memory (RAM), read-only memory (ROM), electrically erasable programmable read-only memory (EEPROM), flash memory, a hard disk drive, etc. Hardware may include a processing resource, such as a microcontroller, a microprocessor, central processing unit (CPU) core(s), an application-specific integrated circuit (ASIC), a field programmable gate array (FPGA), and/or other hardware device suitable for retrieval and/or execution of instructions from the machine readable medium.

The computing environment 100 may include a triggering entity 160. The triggering entity 160 is to detect a system error or security threat and trigger remedial action. The triggering entity 160 may be internal or external to the computing system 110. The triggering entity may be in a secure location. For example, the triggering entity could be installed at a trusted level of the computing system 110, e.g. in secure firmware. In other examples, the triggering entity may be implemented in the user interface, allowing a user to activate the trigger. In still other examples, the triggering entity may be at an external location such as at an orchestration layer which manages the computing system or in an external network monitoring device. In FIG. 1A the triggering entity 160 is shown as external to the computing system 110.

The triggering entity 160 may be a hardware device or a combination of hardware and programming, such as a computer. In some examples, the triggering entity 160 may be a threat detection system that, using hardware or a combination of hardware and programming, monitors and detects security threats and attacks on the computing system 110, monitors and analyzes network traffic (e.g., DNS traffic) related to the computing system 110, monitors kernel integrity of the computing system 110, performs other security threat monitoring, or any combination of the foregoing. In some examples, the triggering entity 160 may be a rejuvenation system that, using hardware or a combination of hardware and programming, refreshes components of the computing system 110 at scheduled times (e.g., by restarting, rebooting, or killing and recreating those components) to preempt security issues.

If the triggering entity 160 is implemented external to the computing system 110, then it may be in communication with the computing system 110 via any wired and/or wireless communication technology or network (e.g., Ethernet, Universal Serial Bus or USB, optical fiber, Wi-Fi®, Bluetooth®, etc.). In some cases, the triggering entity 160 may be implemented by or on the computing system 110 itself.

As mentioned above, the computing environment 100 may include a recovery script repository 170, a forensic capture repository 180, and a snapshot repository 190. These repositories 170, 180, 190 may be external to the computing system 110 and may be in communication with the computing system 110 via any wired and/or wireless communication technology or network (e.g., Ethernet, Universal Serial Bus or USB, optical fiber, Wi-Fi®, Bluetooth®, etc.). The repositories 170, 180, 190 may each include a persistent storage device, such as a solid state drive, a hard disk drive, a tape drive, persistent memory, or a device based on other storage medium, for storage of data. The recovery script repository 170 may store recovery scripts that include capture action (s) and/or recovery action(s), or a sequence thereof. The forensic capture repository 180 may receive and store capture data about the components (e.g., 121, 131, 141, 151 to be described below) of the computing system 110, such as disk images, memory snapshots, or application configuration files. The snapshot repository 190 may store snapshots, images, files, or the like, of components (e.g., 121, 131, 141, 151) of the computing system 110 when in a known good state.

The computing system 110, using hardware or a combination of hardware and programming included therein, may establish a plurality of abstraction layers (e.g., 120, 130, 140, 150) and a component (e.g., 121, 131, 141, 151) operating at some or each of the abstraction layers. For example, as illustrated in the example of FIG. 1A, the computing system 110 may have an abstraction layer 120 that is the physical hardware (also referred to as the physical layer) that includes an operating system component 121 with a type-2 hypervisor installed thereon. The hypervisor may in turn create, run, and manage a VM that is a component 131 at an abstraction layer 130 (also referred to as the virtual layer). The VM of abstraction layer 130 may have a container engine installed thereon, and the container engine may create, run, and manage a container component 141 at an abstraction layer 140 (also referred to as the container layer). The container (component 141) may hold an application (also referred to as a containerized application) and a related runtime environment, and the application may be deemed a component 151 at an abstraction layer 150 (also referred to as the application layer).

The abstraction layers and components depicted in FIG. 1A are an example, and other numbers or combinations of abstraction layers and components may be employed in other examples. For example, a hypervisor may run and manage a plurality of VMs, and a container engine of the VM may run multiple containers. Further, while FIG. 1A depicts a computing system with four abstraction layers: a physical layer 120, a virtual layer 130, a container layer 140 and an application layer 150; in other examples a computing system may include the physical layer 120 and at least one of a virtual layer 130, a container layer 140 and an application layer 150. For example, there may be no container layer, such that the applications are installed directly in the VMs of the virtual layer. In still another example, there may be no virtual layer, such that the containers are installed in a container layer directly below the operating system layer.

The abstraction layers 120, 130, 140, 150 may be deemed hierarchical, by virtue of management relationships. For example in that abstraction layer 120 is higher than abstraction layer 130 by virtue of the hypervisor at layer 120 managing the VM (131) of layer 130. Additionally, abstraction layer 130 is higher than abstraction layer 140 by virtue of the container engine on the VM (131) at layer 130 managing the container (141) of layer 140. Additionally, abstraction layer 140 is higher than abstraction layer 150 by virtue of the container (141) holding the application (151) of layer 150. Abstraction layer 150 may be deemed the lowest level in the example of FIG. 1A.

The computing environment 100 includes at least one recovery service 122 and one or more recovery agents (abbreviated R.A. in FIG. 1) 124, 134, 144. The one or more recovery services and recovery agents may be deployed using hardware or a combination of hardware and programming included therein. Each recovery service 122 is to receive a recovery script from the external recovery script repository 170. The recovery agents are to perform a recovery action and/or a capture action in response to a request from a recovery service.

Each recovery agent is installed in a respective abstraction layer and associated with a component in a lower abstraction layer. In this context, a recovery agent is considered to be associated with a component if the recovery agent is able to perform at least one of a capture action and recovery action on the component. Each recovery agent is thus configured to perform a capture and/or recovery action on a component in an abstraction layer below.

The recovery service 122 may be installed in an abstraction layer of the computing system 100. For example, in FIG. 1A, the recovery service 122 is shown as being installed in the first abstraction layer 120 (which may for example be the operating system or a hypervisor of the operating system). However, in other examples the recovery service may be external to the computing system 110. For instance, the recovery service 122 may be installed in another computing device of the computing environment 100 and connected to the computing system 110 via any wired and/or wireless communication technology or network.

In some implementations, a component installed in an abstraction layer may run or execute a recovery service or recovery agent for that abstraction layer. For example, the operating system component 121 may run the recovery service 122 or recovery agent 124 at abstraction layer 120. In some examples, a recovery agent may implemented as a thread of recovery service in the same abstraction layer. In other examples a recovery agent may be implemented separately from a recovery service in the same abstraction layer, for example as a daemon.

The recovery service(s) and recovery agents taken collectively may be understood to form, at least in part, an architecture for capturing and recovering components of virtualized or containerized computing systems. The recovery service(s) may operate as orchestrators by forwarding actions in accordance with the recovery script and recovery agents may operate as implementers of the capture and/or recovery actions.

A recovery agent includes an interface to receive, from a recovery service, a request to perform a capture action and/or a recovery action. The recovery service may be at the same abstraction layer as the recovery agent, at a higher abstraction layer than the recovery agent, or external to the computing system 110. The recovery agent executes the requested capture and/or recovery actions by acting directly or indirectly on a component at a next lower abstraction layer relative to the recovery agent. For example, the recovery agent may interact with a management component at the abstraction layer in which the recovery agent resides to act on a component at the next lower abstraction layer which is managed by that management component, as will be illustrated in examples below. In some examples, the lowest abstraction layer of a computing system may not have a recovery agent and/or recovery service, as there is not a next lower abstraction layer to act on.

A recovery service may have an interface to receive recovery scripts and to forward actions included in the recovery script. For example, the recovery service 122 may receive a recovery script from the external recovery script repository 170. The recovery service may process a recovery script to determine a capture action, recovery action or sequence of capture and/or recovery actions included in the recovery script. The recovery service may determine, for each action, a recovery agent which is able to perform the action on the target component of the action. The recovery service may then request the determined recovery agent to perform the action on the target component. For instance, the recovery service may forward the action directly or indirectly to the determined recovery agent.

The recovery service may use various ways to determine which recovery agent to forward an action to. For example, the recovery script may specify a recovery agent ID of a recovery agent which is able to perform the action on the target component. In another example, the recovery script may specify a target component ID and the recovery service may determine a recovery agent based on the target component ID. In other examples, the recovery script may specify both a target component ID and a recovery agent ID. This latter approach may be helpful where a recovery agent is associated with a plurality of components. In still another example, the recovery service may determine an abstraction layer in which the target component is installed based on the target component ID and may forward the action to a recovery agent installed in an abstraction layer above the target component.

FIG. 1A depicts a single recovery service 122 which is installed at the physical abstraction layer 120. However, in other examples the recovery service 122 could be installed on a different abstraction layer of the computing system 110, or external to the computing system 110. FIG. 1A also depicts a recovery agent 124 (also referred to as a physical host recovery agent) at the abstraction layer 120, a recovery agent 134 (also referred to as a virtual machine recovery agent) at the abstraction layer 130, and a recovery agent 144 (also referred to as a container recovery agent) at the abstraction layer 140. The recovery agent 124 may interface with the hypervisor of operating system component 121 at layer 120 to perform recovery actions on the VM component 131 at the next lower layer 130. The recovery agent 134 may interface with the container engine of the VM component 131 at layer 130 to perform recovery actions on the container component 141 at the next lower layer 140. The recovery agent 144 may directly perform recovery actions on the application component 151 at the next lower layer 150, using application-specific handlers for example.

Figure 1B:
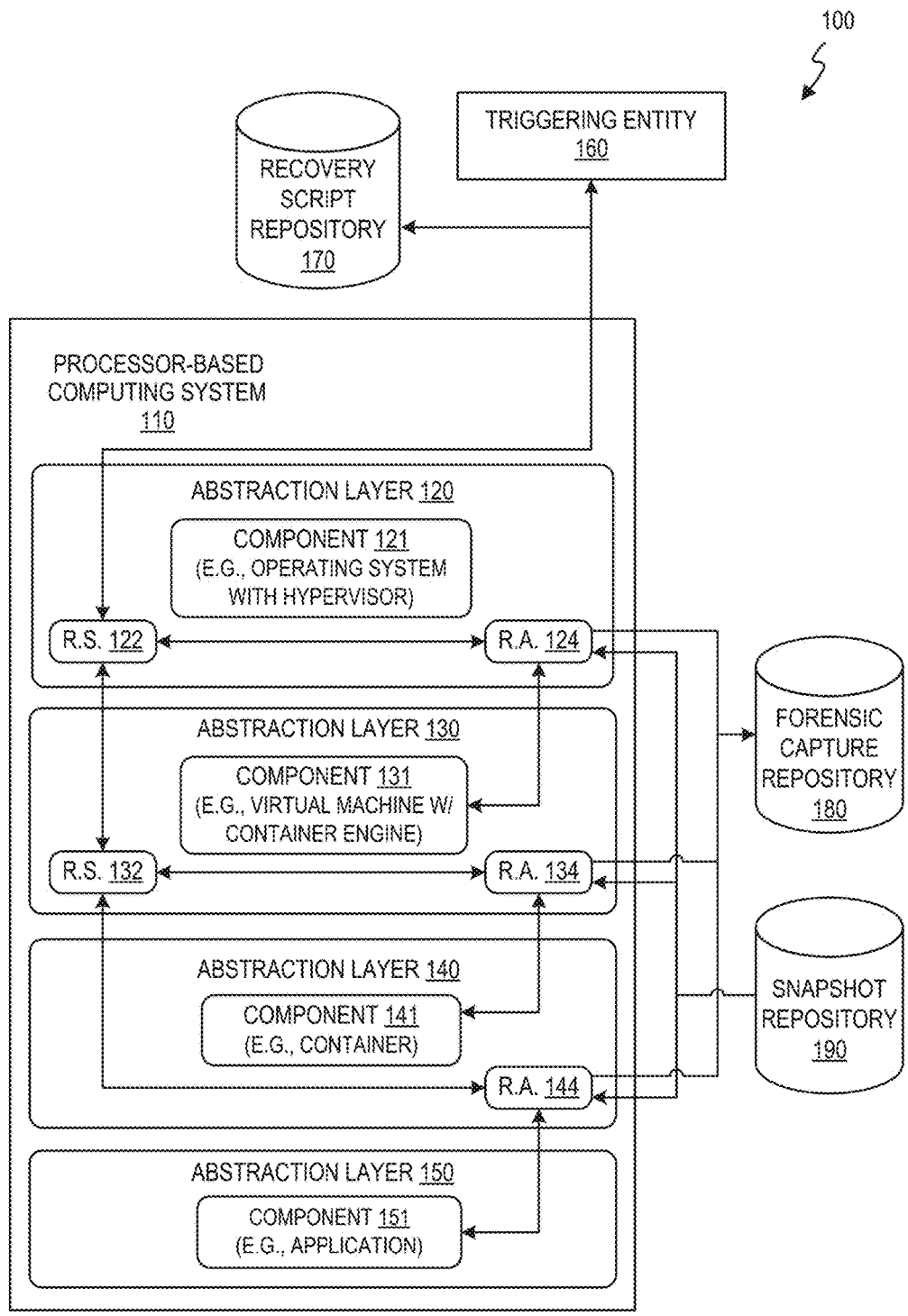
FIG. 1B is a block diagram depicting an example computing environment that includes a recovery service and recovery agents.

In other examples, there may be a plurality of recovery services each recovery service being installed in a different abstraction layer of the computing system 110. For example, FIG. 1B depicts a computing environment which is similar to FIG. 1A, but in which there are a plurality of recovery services. A recovery service 122 installed in the physical abstraction layer 120 (also referred to as a physical host recovery service 122) and a recovery service 132 installed in the virtual abstraction layer 130 (also referred to as a virtual machine recovery service 132).

When there are plurality recovery services, in some instances a recovery service may forward actions to another recovery service at a lower abstraction layer to reach the appropriate recovery agent able to act on the target component. In other instances, the triggering entity may pass a recovery script directly to the recovery service at the appropriate layer by bypassing intermediary recovery services. A recovery service may also receive feedback from a recovery agent indicating the outcome of executing the recovery action(s) (e.g., indications of success or failure, quantitative parameters, etc.), and may pass the feedback up to the triggering entity 160.

In the example of FIG. 1B, there is no finer level of granularity below the application layer 150 and thus no orchestration for which a recovery service would be deployed at the application layer 150. Therefore, the recovery service 132 at the virtual layer 130 may forward recovery actions directly to the recovery agent 144 for action on components in the application layer 150.

As described above, the external recovery script repository 170 may store one or more recovery scripts, each recovery script including a capture action, recovery action or a sequence of capture and/or recovery actions to be performed by one or more recovery agents. The recovery script may specify which recovery agent is to perform each action. In some examples, a recovery script may include instructions to perform one or more capture actions followed by one or more recovery actions.

The recovery scripts may be generated manually by a user and/or in an automated manner by a computer. A recovery script may be designed for a specific computing system so that it includes actions directed to some or all of the various components of the specific computing system. A recovery script may be designed to remediate system errors or security threats in general, or may be tailored to a particular system error or security threat. There may be a plurality of recovery scripts and an appropriate script may be selected by the triggering entity.

Each recovery agent may be context specific in that a recovery agent may be configured to carry out capture and/or recovery action(s) tailored to a component which the recovery agent is associated with. Thus recovery agents installed in different abstraction layers may be configured to perform different types of capture and/or recovery actions from each other. For instance, a recovery agent (e.g., 124) associated with a virtual machine (e.g., 131) may be configured to recover the virtual machine by re-imaging the virtual machine. A recovery agent (e.g., 144) associated with an application (e.g., 151) may be configured to invoke an application handler to reset the application to a pre-set state. In this way, in some examples, the recovery service and recovery script need not specify details of how to capture or recover a particular component, as these operational details may be handled by the recovery agent. This modular approach may help to keep the recovery scripts simple and easier to write and may reduce the size and complexity of the recovery service.

Hackers may attempt to conceal evidence of an attack on the computer system, or prevent diagnosis of the attack, by accessing the forensic capture repository to delete or alter captured snapshots. In order to defend against such unauthorized changes, the forensic capture repository 180 may be cryptographically secured. Furthermore, the forensic capture repository may be time-stamped database so that the time of changes is known. In some examples, the forensic capture repository may be configured as append only so that while further captures can be added, previous captures cannot be deleted. In this way the forensic capture repository may be defended against attack.

The snapshot repository 190 may be external to the computer system so that it is unlikely to be compromised by a system error or system threat to the computer system. The snapshot repository 190 may be secured behind a firewall and/or cryptographically secured in order to defend against attack.

Figure 2:
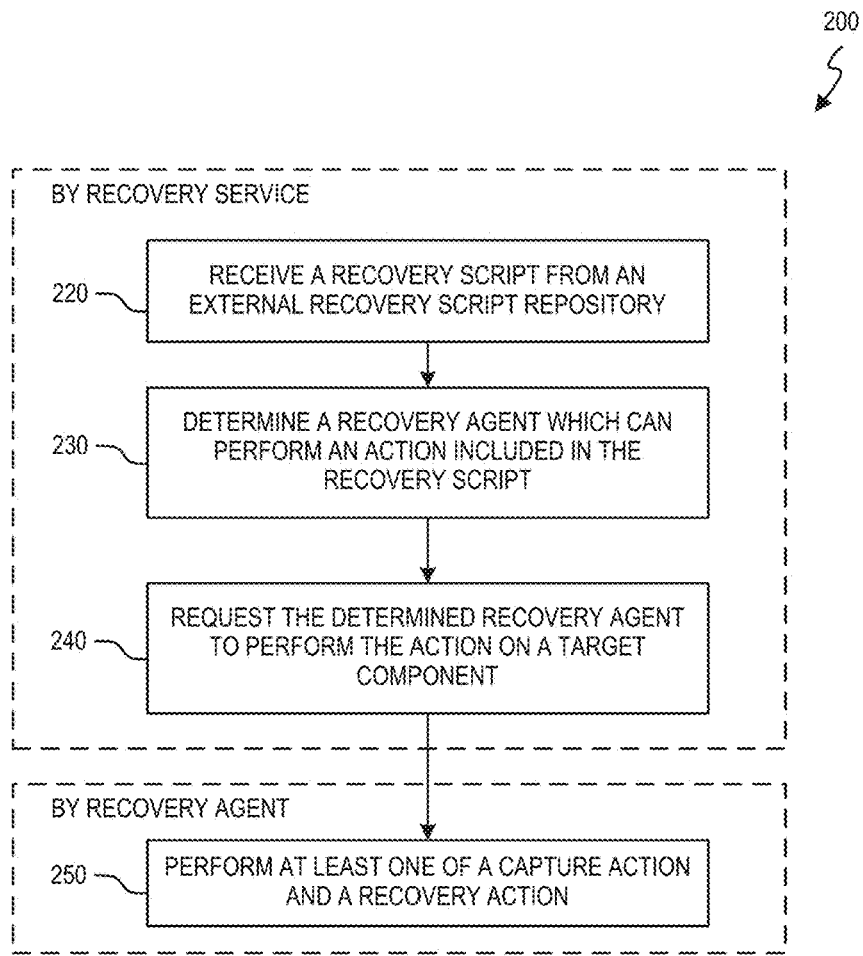
FIG. 2 is a flow diagram depicting an example method for capturing and/or recovering a component of a computing system.

An illustrated method 200 of capturing and/or recovering a component of computing system 110 will now be described with reference to the flow diagram of FIG. 2 and the computing environment of FIG. 1A or 1B.

Method 200 may be implemented in the form of executable instructions stored on a machine readable medium and executed by a processing resource (e.g., a microcontroller, a microprocessor, central processing unit core(s), an ASIC, an FPGA, etc.) and/or in the form of electronic circuitry. For example, method 200 may be described below for illustrative purposes as being performed by a recovery service and a recovery agent implemented as hardware or a combination of hardware and programming, such as the recovery service 122 or 132 and the recovery agent 124, 134, or 144 of the processor-based computing system 110 described above. In some implementations, method 200 may include more or fewer blocks than are shown in FIG. 2. In some implementations, one or more of the blocks of method 200 may, at certain times, be ongoing and/or may repeat.

At 220 a recovery service (e.g. 122) receives a recovery script from the external recovery script repository (e.g. 170).

The recovery script may be received in response to the recovery service (e.g. 122) actively requesting the recovery script, or received as a result of the external recovery script repository pro-actively pushing the recovery script to the recovery service. The recovery service may have access to a proxy or naming service though which it can locate the external recovery script repository.

In one example, in response to detection of a system error or a system threat, a triggering entity (e.g. 160) may trigger the recovery service (e.g. 122) to request the recovery script from the external recovery script repository (e.g. 170), or trigger the external recovery script repository to push the recovery script to the recovery service. The detection of the system error or system threat may be performed by the triggering entity, or by another computing component in communication with the triggering entity. The recovery script may be a recovery script that has been selected by the triggering entity specifically to correspond to the detected system error or security threat, or may be a default script which is designed for the particular recovery service.

The triggering entity 160 and recovery script repository 170 may be separate from each other. Therefore, in some examples, the system may be kept simple and may utilize existing error or threat detection systems by keeping the generation and provision of recovery scripts separate from the triggering action and detection of a system error or system threat.

At 230 the recovery service (e.g. 122) determines, for an action in the recovery script, a recovery agent that can perform the action on a target component of the action.

At 240 the recovery service (e.g. 122) requests the determined recovery agent to perform the action on the target component, for example by forwarding the action to the recovery agent. The target component may be a component which is associated with the recovery agent and installed in an abstraction layer below the recovery agent.

Blocks 230 and 240 may be executed for every action in the recovery script. The recovery script may include one or more capture actions, one or more recovery actions or a combination of capture and recovery actions. The recovery script may specify an order in which the actions are to be carried out and may specify which recovery agent is to carry out each action.

In some examples the recovery service may receive a plurality of scripts and execute the plurality of recovery scripts in parallel. In this case, each recovery script may include actions which are independent of actions in the other recovery scripts. In this way the recovery service may process a large number of actions in an efficient manner.

At 240 the determined recovery agent (e.g. 124), performs at least one of a capture action and a recovery action in accordance with the instructions received from the recovery service (e.g. 122).

Figure 3:
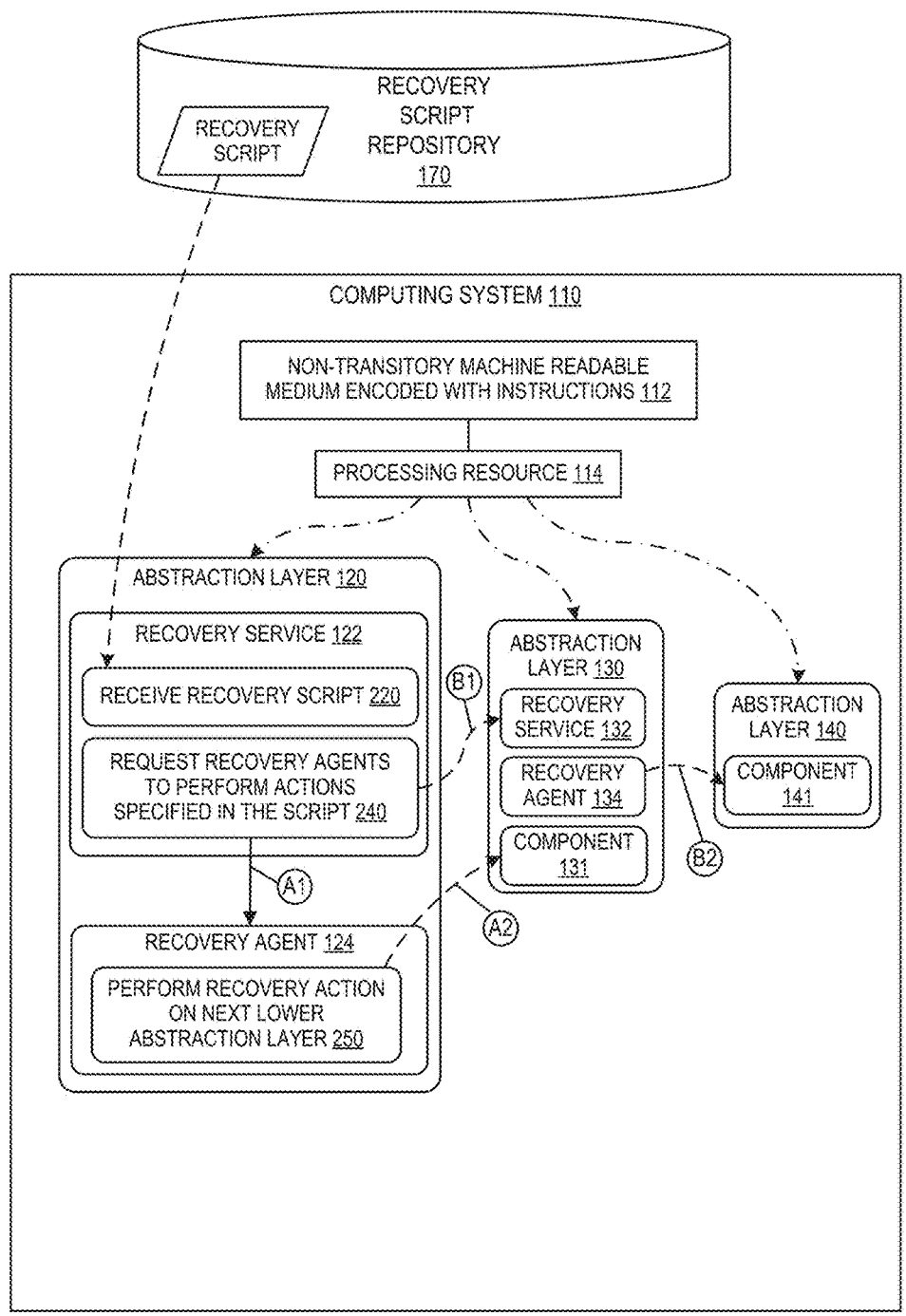
FIG. 3 is block diagram depicting an example computing system that includes a recovery service and recovery agents.

FIG. 3 is block diagram depicting an example computing system 110 that employs the above described method. The computing system of FIG. 3 may be the same or similar to the computing system of FIG. 1B and therefore like reference numerals are used to indicate the same or similar parts. The computing system 110 includes a processing resource 114 and a non-transitory machine readable medium 112. The processing resource 114 may be a hardware processing resource, such as a microcontroller, a microprocessor, CPU core(s), an ASIC, an FPGA, and/or other hardware device suitable for retrieval and/or execution of instructions from the machine readable medium 112. The machine readable medium 112 may include RAM, ROM, EEPROM, flash memory, a hard disk drive, or the like.

The medium 112 stores instructions that, when executed by the processing resource 114, cause the processing resource 114 to perform the functionality described below. The processing resource 114 may execute instructions to establish abstraction layers on the computing system 110, as denoted by the dot-dash lines in FIG. 3. While three abstraction layers 120, 130, 140 are depicted in FIG. 3, more or fewer abstraction layers may be established on other example computing systems. These abstraction layers may be analogous to the abstraction layers described in FIG. 1A and FIG. 1B and may include components as described above for FIG. 1A and FIG. 1B. The abstraction layers 120, 130, 140 may be hierarchical, that is, layer 140 is lower than layer 130 and layer 130 is lower than layer 120.

The processing resource 114 also may execute instructions to deploy a recovery service to at least one abstraction layer. For example, a recovery service 122 may be deployed to the abstraction layer 120, and a recovery service 132 may be deployed to the abstraction layer 130. Such recovery service(s) may be analogous to the recovery services described above with respect to FIG. 1A and FIG. 1B. The processing resource 114 may execute instructions to deploy a recovery agent to at least one abstraction layer. For example, a recovery agent 124 may be deployed to the abstraction layer 120 and a recovery agent 134 may be deployed to abstraction layer 130. Such recovery agent(s) may be analogous in many respects to the recovery agents described above with respect to FIG. 1A and FIG. 1B.

The processing resource 114 may execute instructions (e.g., 220) to receive, at a recovery service 122 of a particular abstraction layer 120, a recovery script to address a system error or security threat to the computing system 200. The processing resource 114 may execute instructions to process the recovery script to determine a recovery agent for each recovery action in the recovery script. This is analogous to block 230 of FIG. 2. The recovery agent may request the determined recovery agent(s) to perform the recovery actions specified in the recovery script. This is analogous to block 240 of FIG. 2.

For example, the processing resource 114 may execute instructions to cause the recovery service 122 to request the recovery agent 124 in the same abstraction layer 120 to perform a recovery action on a component 131 at the next lower abstraction layer 130. The encircled "A1" depicts this recovery action being forwarded by recovery service 122 to recovery agent 124.

In response to recovery agent 124 receiving the request "A1", the processing resource 114 may execute instructions to cause the recovery agent 124 to perform the recovery action on component 131 as shown by the encircled "A2" in FIG. 3. This is analogous to block 250 of FIG. 2.

In other cases, a recovery action included in the recovery script may target an abstraction layer which is several layers (e.g. two or more layers) lower than the recovery service 122 which receives the recovery script. In that case, the processing resource 114 may execute instructions to cause the recovery service 122 to forward the recovery action to a recovery service 132 in a lower abstraction layer 130 as shown by the encircled "B1" in FIG. 3. The recovery service 132 in abstraction layer 130 may then request a recovery agent 134 in the same abstraction layer 130 to perform the recovery action on a component 141 in the abstraction layer 140 below. The recovery agent 134 may then perform the recovery action on the component 141 in the abstraction layer below, as shown by the encircled "B2" in FIG. 3. In other examples, the recovery service 122 may forward the recovery action directly to the recovery agent 134. In still other examples, the recovery service 132 in the abstraction layer 130 may receive a recovery script directly from the external recovery script repository 170.

While the flow of FIG. 3 has been described above with reference to recovery actions, it is to be understood that the same principles and flow of operation may be applied to capture actions included in a recovery script.

Figure 4:
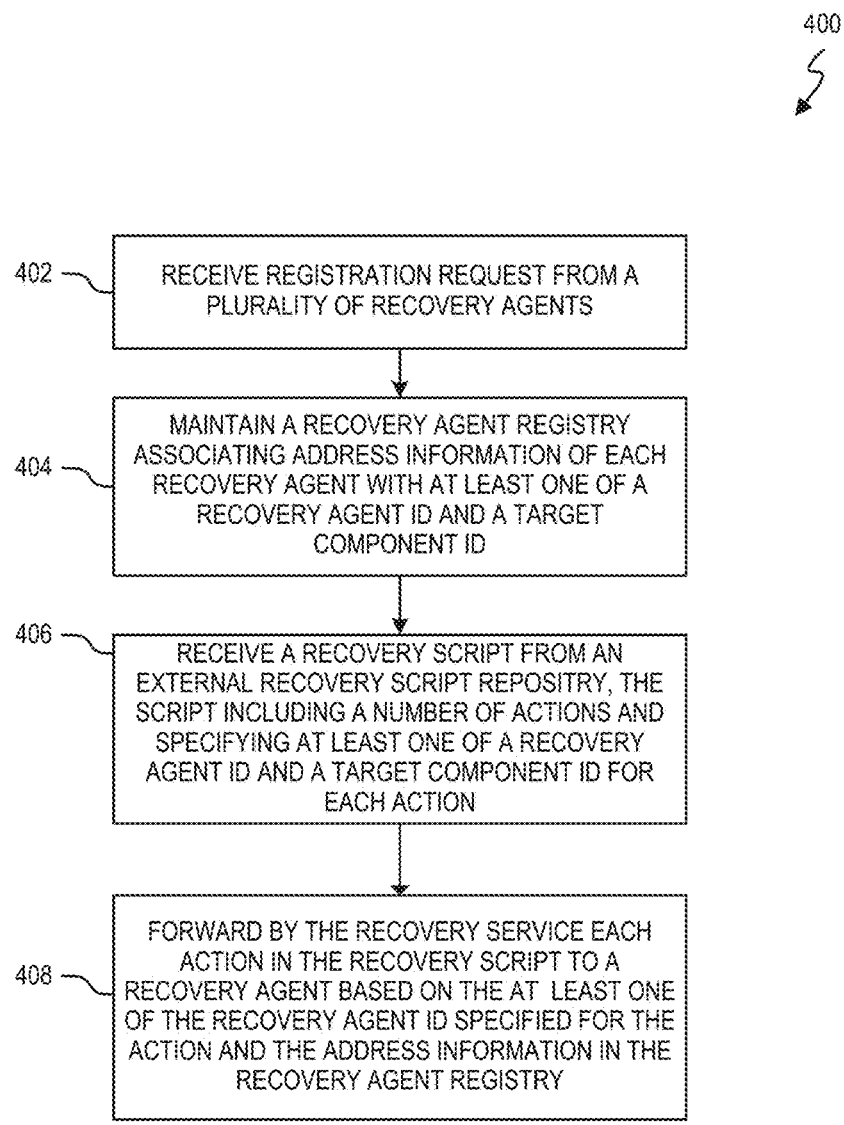
FIG. 4 is a flow diagram depicting an example method of operation of a recovery service.

FIG. 4 is a flow diagram depicting an example method of operation 400 of a recovery service. Method 400 may be implemented in the form of executable instructions stored on a machine readable medium and executed by a processing resource (e.g., a microcontroller, a microprocessor, central processing unit core(s), an ASIC, an FPGA, etc.) and/or in the form of electronic circuitry. For example, method 400 may be described below for illustrative purposes as being performed by a processor based recovery service, such as the recovery service 122 or 132 described above. In particular FIG. 4 illustrates a method of interaction of a recovery service with associated recovery agents.

In some implementations, one or more blocks of method 400 may be executed substantially concurrently or in a different order than shown in FIG. 4. In some implementations, method 400 may include more or fewer blocks than are shown in FIG. 4. In some implementations, one or more of the blocks of method 400 may, at certain times, be ongoing and/or may repeat.

At block 402 the recovery service receives registration requests from a plurality of recovery agents. Each registration request may be a request for a recovery agent to associate with the recovery service and may include address information of the recovery agent. Address information may be information that enables the recovery service to send requests to the recovery agent, for example a memory address or port by which the recovery agent may be reached. In some examples, a registration request may further include an identifier (ID) of the recovery agent, while in other examples the recovery service may assign an ID to the recovery agent upon receiving the registration request. In some examples, the registration request may further include target component ID(s) of component(s) on which the recovery agent is to act.

At block 404, the recovery service maintains a recovery agent registry associating address information of each recovery agent with at least one of a recovery agent ID and target component ID. For example, the recovery agent registry may be a table stored on a non-transitory machine readable medium accessible by the recovery service. In one example the recovery agent registry is stored in an area of memory reserved by the recovery service.

At block 406, the recovery service receives a recovery script from an external recovery script repository. The script may include a number of capture and/or recovery actions and may specify at least one of a recovery agent ID and a target component for each respective action.

At block 408, the recovery service forwards each action in the recovery script to a recovery agent based on the at least one of a recovery agent ID and a target component specified for each action and based on the corresponding recovery agent address information in the recovery agent registry. Thus, the recovery agent to which an action is forwarded may be determined based on the at least one of a recovery agent ID and a target component specified for the action and based on the recovery agent address information in the recovery agent registry.

Figure 5:
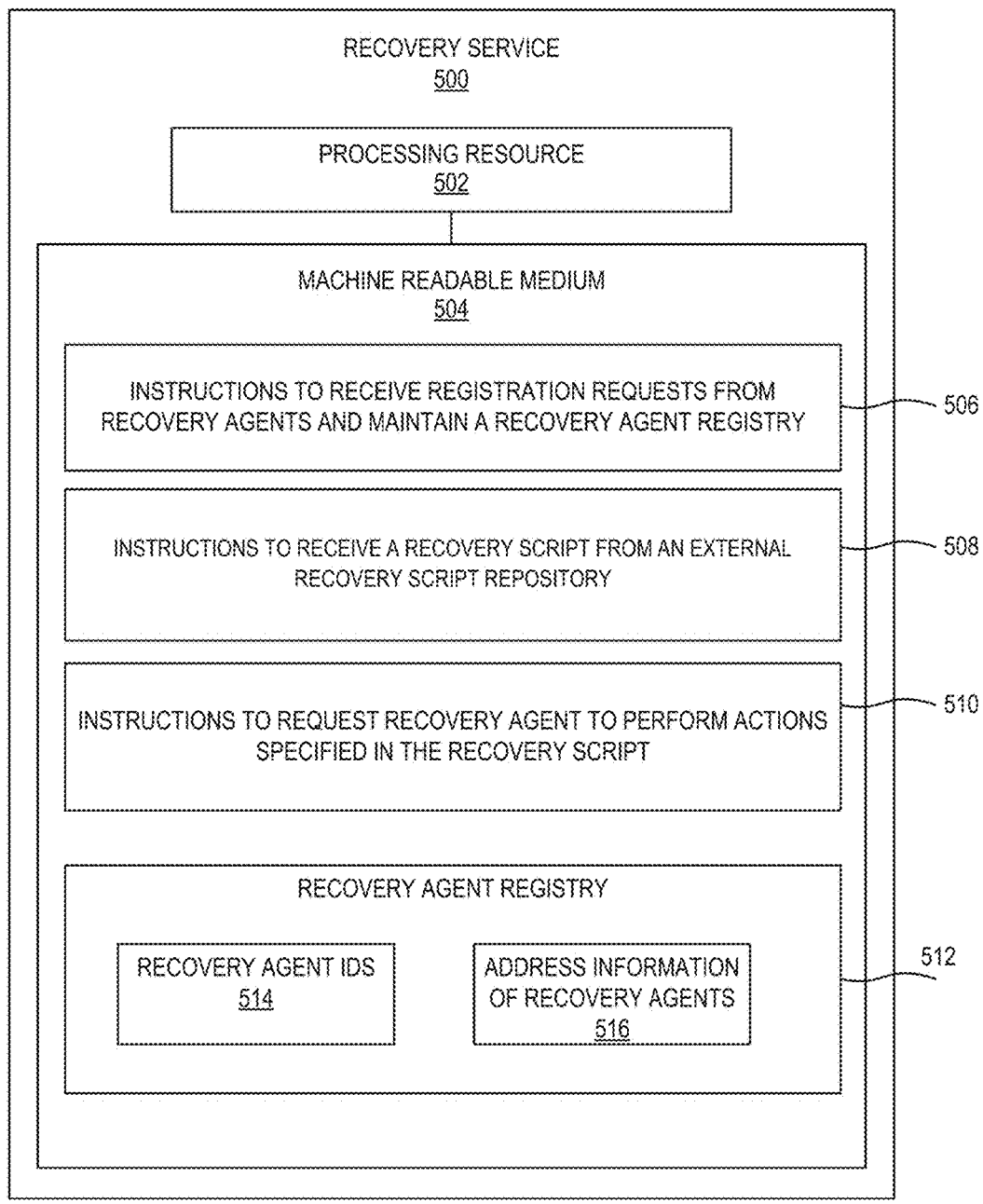
FIG. 5 is a block diagram depicting an example recovery service.

FIG. 5 is a block diagram depicting an example recovery service 500 that may employ the method described in FIG. 4. The recovery service 500 may in many respects be analogous to the recovery service 122 or 132 described in FIGS. 1A, 1B and 3.

The recovery service 500 includes a processing resource 502 and a non-transitory machine readable medium 504. The processing resource 502 may be a hardware processing resource, such as a microcontroller, a microprocessor, CPU core(s), an ASIC, an FPGA, and/or other hardware device suitable for retrieval and/or execution of instructions from the machine readable medium 504. The machine readable medium 504 may include RAM, ROM, EEPROM, flash memory, a hard disk drive, or the like.

The instructions may include instructions 506 to receive registration requests from recovery agents and to maintain a recovery agent registry. Execution of instructions 506 may be analogous to performing blocks 402 and 404 of FIG. 4. The recovery agent registry 512 may be stored in a non-transitory machine readable medium, such as the storage medium 504 in FIG. 5 or a volatile or non-volatile memory of the recovery service, or in another non-transitory storage medium internal or external to the recovery service. The recovery agent registry may include recovery agent IDs 514 and address information of recovery agents 516.

The instructions may further include instructions 508 to receive a recovery script from an external recovery script repository. Execution of instructions 508 may be analogous to performing block 406 of FIG. 4. The instructions may further include instructions 510 to request recovery agents to perform actions specified in the recovery script. Instructions 510 may for example be implemented by performing block 408 of FIG. 4.

In some examples the recovery agents are stateless. In this context, stateless means that upon being re-imaged, the recovery agent may perform capture and/or recovery actions based on the content of requests received from the recovery service, without depending on any previously stored state information.

In some examples the recovery service(s) are stateless. In this context, stateless means that upon being re-imaged, the recovery service may obtain any information required by the recovery service to perform capture and/or recovery of components of the computing system, without relying on previously stored configuration data.

For instance, upon start-up the recovery service may download a recovery script from the external recovery script repository and receive registration requests from recovery agents. In this way, the recovery service may be able to resume execution of a recovery script, even if execution is interrupted by re-imaging of the recovery service. In some examples, there may be a number or recovery scripts and the triggering entity may detect when the recovery service is re-imaged and may coordinate with the external recovery script repository so that the recovery service is not sent a recovery script(s) which has been executed just prior to the re-imaging, but is sent a recovery script(s) which has not yet been executed.

In other examples, the triggering entity may coordinate with the recovery script repository so that the recovery service is not sent portions of a recovery script which were executed prior to re-imaging, but is sent portions of a recovery script have not yet been executed.

If the recovery service and/or recovery agents are stateless then the recovery service and/or recovery agent may be re-imaged part way through recovery of a computing system. Re-imaging of the recovery service and/or recovery agent may be carried out after execution of a recovery script, at a set point in a recovery script, periodically or when triggered by a user or the triggering entity. As explained below, re-imaging of the recovery service and/or recovery agent may enhance security.

Figure 6:
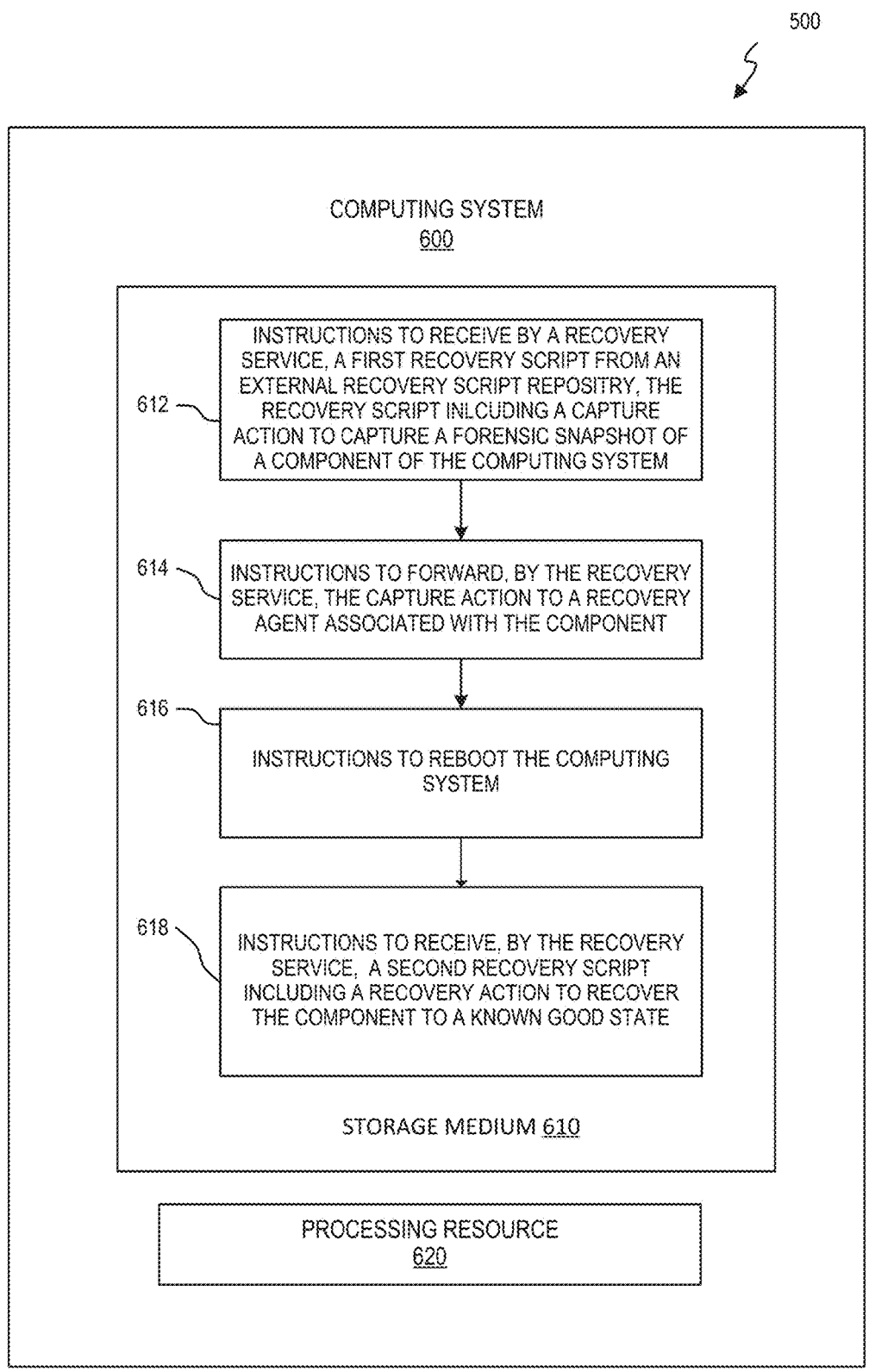
FIG. 6 is a block diagram depicting an example system that includes a non-transitory, machine readable medium encoded with example instructions for recovering a component of a computing system.

FIG. 6 is a block diagram of a computing system 600 including a recovery service. The computer system may in many ways be analogous to the computing system 110 depicted in FIGS. 1A and 1B. The recovery service may in many respects be analogous to the recovery service 122 or 132 described in FIGS. 1A, 1B and 3.

The computing system 600 includes a processing resource 620 and a non-transitory machine readable medium 610. The processing resource 620 may be a hardware processing resource, such as a microcontroller, a microprocessor, CPU core(s), an ASIC, an FPGA, and/or other hardware device suitable for retrieval and/or execution of instructions from the machine readable medium 610. The machine readable medium 610 may include RAM, ROM, EEPROM, flash memory, a hard disk drive, or the like.

The instructions may include instructions 612 for the recovery service (e.g. 122) to receive a first recovery script from an external recovery script repository (e.g. 170).

In some examples, the instructions may include instructions for the recovery service (e.g. 122) to request a first recovery script from the external recovery script repository (e.g. 170) in response to receiving a trigger from a triggering entity (e.g. 160). In some examples, the address of the external recovery script repository may be included in a trigger from the triggering entity. In other examples, the recovery service may be provided with a proxy or naming service through which it can locate the external recovery script repository.

The first recovery script may include a capture action to capture a forensic snapshot of a component of the computing system. The component may for example be an operating system, hypervisor, virtual machine, container or application etc.

The instructions may include instructions 614 to forward the capture action to a recovery agent associated with the component.

The instructions may include instructions 616 to reboot the computing system 600 after the capture action has been performed. Rebooting the computing system may include rebooting lower level firmware and rebooting the operating system. Rebooting the computing system may clear the volatile memory of the computing system and together with subsequent recovery actions (described below) may help the computing system to recover to a good state.

While rebooting the operating system may cause other components of the computing system to lose their state, the recovery service may be stateless such that it may continue to operate after the reboot. In some examples, described further below, the recovery service may be re-imaged upon reboot of the computing system. Re-imaging of the recovery service from a golden image may ensure that the recovery service is not corrupted or compromised by system errors or malware. Security may be further enhanced if the golden image of the recovery service is linked by a cryptographic chain of trust to trusted lower levels of the computing system, such as a secure part of the kernel or a trusted computing platform.

The instructions may further include instructions 618 to receive a second recovery script including a recovery action to recover a component of the computing system to a known good state.

The instructions may further include instructions to forward the recovery action to a recovery agent associated with the component. In this way the component may be recovered.

In some cases, there may be a plurality of capture and/or recovery actions associated with each recovery script. For example, the instructions 616 may be instructions to reboot the computing system after completing the first recovery script, and more particularly, after capturing a plurality of components in a plurality of layers of abstraction of the computing system as specified by the first recovery script.

In some examples, the first recovery script may include capture actions, while the second recovery script may include recovery actions that are to be performed after completion of the first recovery script. The first and second recovery scripts may be separate phases of the same recovery script or may be separate recovery scripts which are to be performed sequentially. The triggering entity may coordinate with the recovery script repository to send, or the recovery service to request, one recovery script at a time.

Figure 7:
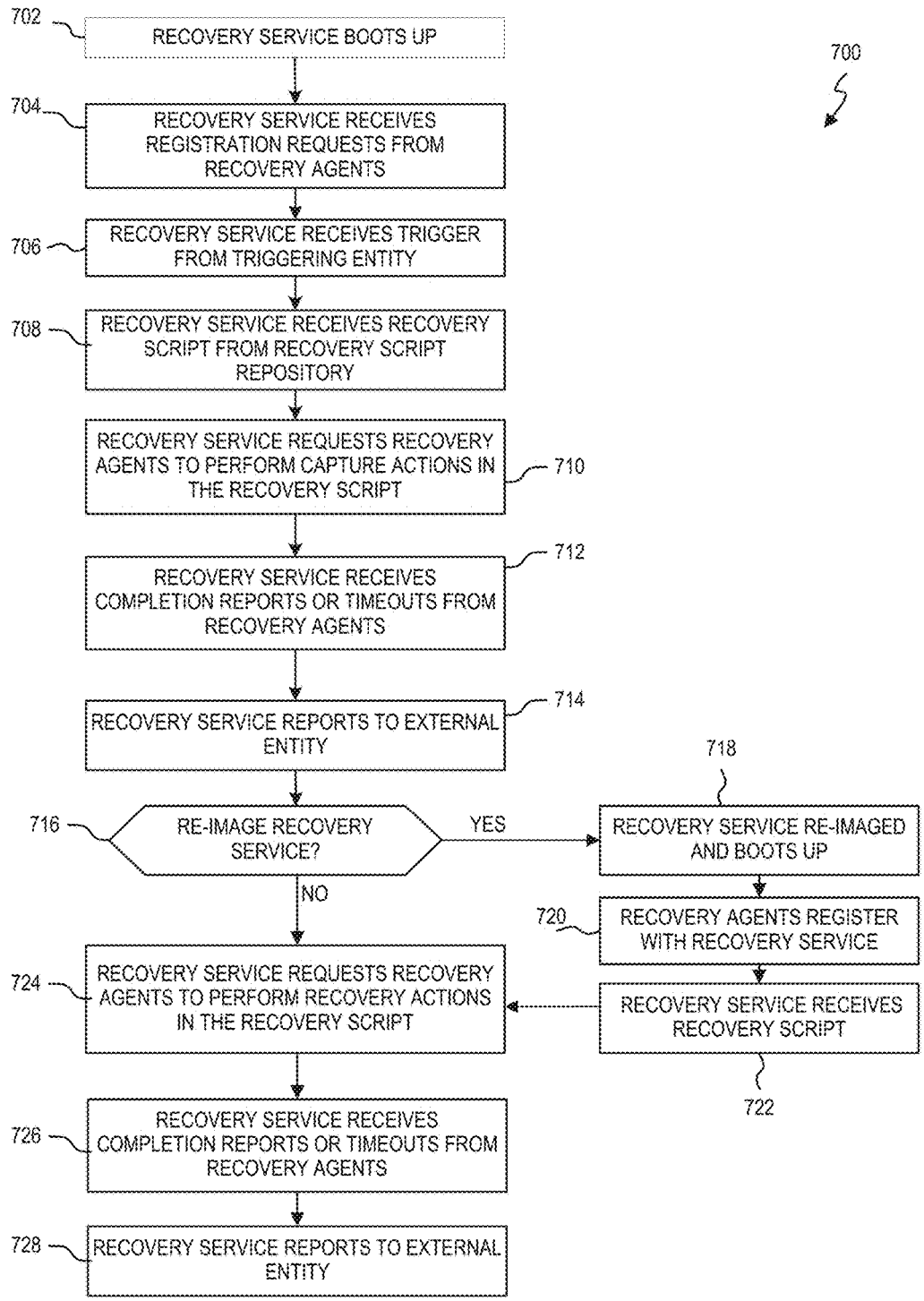
FIG. 7 is a flow diagram depicting an example method of operation of a recovery service.

FIG. 7 is a flow diagram depicting an example method of recovering a computing system by a recovery service. Method 700 may be implemented in the form of executable instructions stored on a machine readable medium and executed by a processing resource (e.g., a microcontroller, a microprocessor, central processing unit core(s), an ASIC, an FPGA, etc.) and/or in the form of electronic circuitry. For example, method 700 may be described below for illustrative purposes as being performed by a recovery service implemented as hardware or a combination of hardware and programming, such as the processor-based recovery service 122 or 132 described in the examples above.

At block 702, the recovery service boots up.

At block 704, the recovery service receives registration requests from recovery agents. Block 704 may be analogous to block 402 of FIG. 4. The recovery service may register the recovery agents with the recovery service, for example by maintaining a recovery agent registry as described in block 404 of FIG. 4.

At block 706, the recovery service receives a trigger from a triggering entity. For example, the triggering entity may trigger the recovery service in response to detecting a system error or system threat to the computing system. The trigger may cause the recovery service to request a recovery script from a recovery script repository. In some examples, the triggering entity may select a recovery script and may specify the selected recovery script in the trigger sent to the recovery service, or may prompt the recovery script repository to make the selected recovery script available to the recovery service.

At block 708, the recovery service receives a recovery script from the recovery service. For example, the recovery script may be downloaded by the recovery service from the recovery script repository.

The recovery script may include a number of capture actions, each capture action to capture a respective component of the computing system. The recovery service may process the received recovery script to determine which actions are to be sent to which recovery agents. For example, the recovery script may specify a recovery agent ID and/or a target component ID for each capture action. The recovery service may determine an address for each recovery agent based on the recovery agent ID and/or target component ID and the address information stored in the recovery agent repository.

If the recovery script specifies a target component, but does not specify a recovery agent, then the recovery service may determine the appropriate recovery agent to forward the capture action to, based on information stored in the recovery agent registry. For example, the recovery agent registry may associate each recovery agent with one or more target components.

At block 710, the recovery service may request recovery agents to perform the capture actions specified in the recovery script. For example, the recovery service may forward each capture action to a respective recovery agent based on a recovery agent ID and/or target component ID and recovery agent address information stored in a recovery agent registry.

At block 712, the recovery service receives completion reports or timeouts from the recovery agents. A completion report may report successful completion of the capture action. A timeout may occur when the recovery service does not receive a completion report from a recovery agent within a predetermined period of time.

At block 714, in response to receiving completion reports or timeouts from each of the recovery agents, the recovery service may send a completion report to an external entity, such as the triggering entity (e.g. 160).

The recovery script, which is received at block 708, may specify an order in which the capture actions included in the script are to be carried out. For example, the recovery script may specify that capture actions directed to components in lower abstraction layers are to be performed before capture actions directed to components in higher abstraction layers.

For example, a recovery service may request a recovery agent to capture an application and may wait for completion or timeout of said capture, before requesting a recovery agent at a higher abstraction layer to capture a container which the application is installed in. In one example, the capture action on the application may cause the application to flush its state to disk, while the capture action on the container may send a snapshot of the container (including the recently saved application state) to a forensic capture repository.

At block 716, a determination may be made whether or not to re-image the recovery service. In some examples, the recovery script may instruct re-imaging at this point, while in other examples the recovery service may be hard coded to automatically re-image after completing the capture actions and before performing recovery actions. In some examples, the operating system of the computing system may be re-booted at block 716. Re-boot of the operating system, may cause the recovery service to be re-imaged.

As the recovery service is stateless, it may be re-imaged and may resume operation after having been re-imaged. Re-imaging the recovery service may help to improve security, as the recovery service may be re-imaged from a trusted golden image. A trusted golden image may for example be stored in a snapshot repository (e.g. 190) and may be cryptographically secured. In one example, a golden image of the recovery service may be linked by a cryptographic chain of trust to a trusted lower level of the computing system operating system or firmware. For example, the recovery service golden image may be linked by a chain of trust to a trusted platform module (TPM) or other secure location at a lower level of the computing system. In this way, it can be reasonably certain that the re-imaged recovery service is free from malware and in a good working state.

If the recovery service is to be re-imaged then the method proceeds to block 718. At block 718, the recovery service is re-imaged and boots up again. At block 720, recovery agents re-register with the recovery service. Block 720 may be analogous to block 704 described above.

At block 722, the recovery service receives a recovery script from the external recovery script repository. For example, the recovery service may request a recovery script upon re-boot or when triggered by the triggering entity. In some examples, the recovery script received at block 708 may be a first recovery script including capture actions, while the recovery script received at block 722 may be a second recovery script including recovery actions. In other words, the recovery script received at block 722 may be for use in a recovery phase, after capture actions have been performed. The sequencing of different scripts which are received by the recovery service may be controlled by the triggering entity. After block 722, the method 700 proceeds to block 724.

In other examples, the recovery service is not re-imaged and the method 700 proceeds directly from block 716 to block 724. In this case, the recovery service may receive a new recovery script, or may continue executing the same recovery script, but transition from a capture phase to a recovery phase of the recovery script.

At block 724, the recovery service may request recovery agents to perform the recovery actions specified in the recovery script. For example, the recovery service may forward each recovery action to a respective recovery agent based on at least one of a recovery agent ID and a target component ID specified in the recovery script and based on the corresponding recovery agent address information stored in a recovery agent registry.

At block 726, the recovery service receives completion reports or timeouts from the recovery agents. A completion report may report successful completion of the recovery action. A timeout may occur when the recovery service does not receive a completion report from a recovery agent within a predetermined period of time.

At block 728, in response to receiving completion reports or timeouts from each of the recovery agents, the recovery service may send a completion report to an external entity, such as the triggering entity (e.g. 160). The recovery process may end here.

In the above example, the recovery service may be re-imaged at block 716 after completion of the recovery actions in the recovery script. In other examples, the recovery service may be re-imaged at different points in time. For example, the recovery service may be re-imaged periodically, or in response to an instruction from the triggering entity. For instance, the recovery service may be re-imaged after receiving the recovery script and before requesting recovery agents to perform actions in the recovery script. In that case, the recovery service may simply re-load the recovery script upon being re-imaged. In another example, the recovery service may be re-imaged part way through executing a recovery script. In that case, upon being re-imaged the recovery service may download and recommence the recovery script from the beginning.

Figure 8:
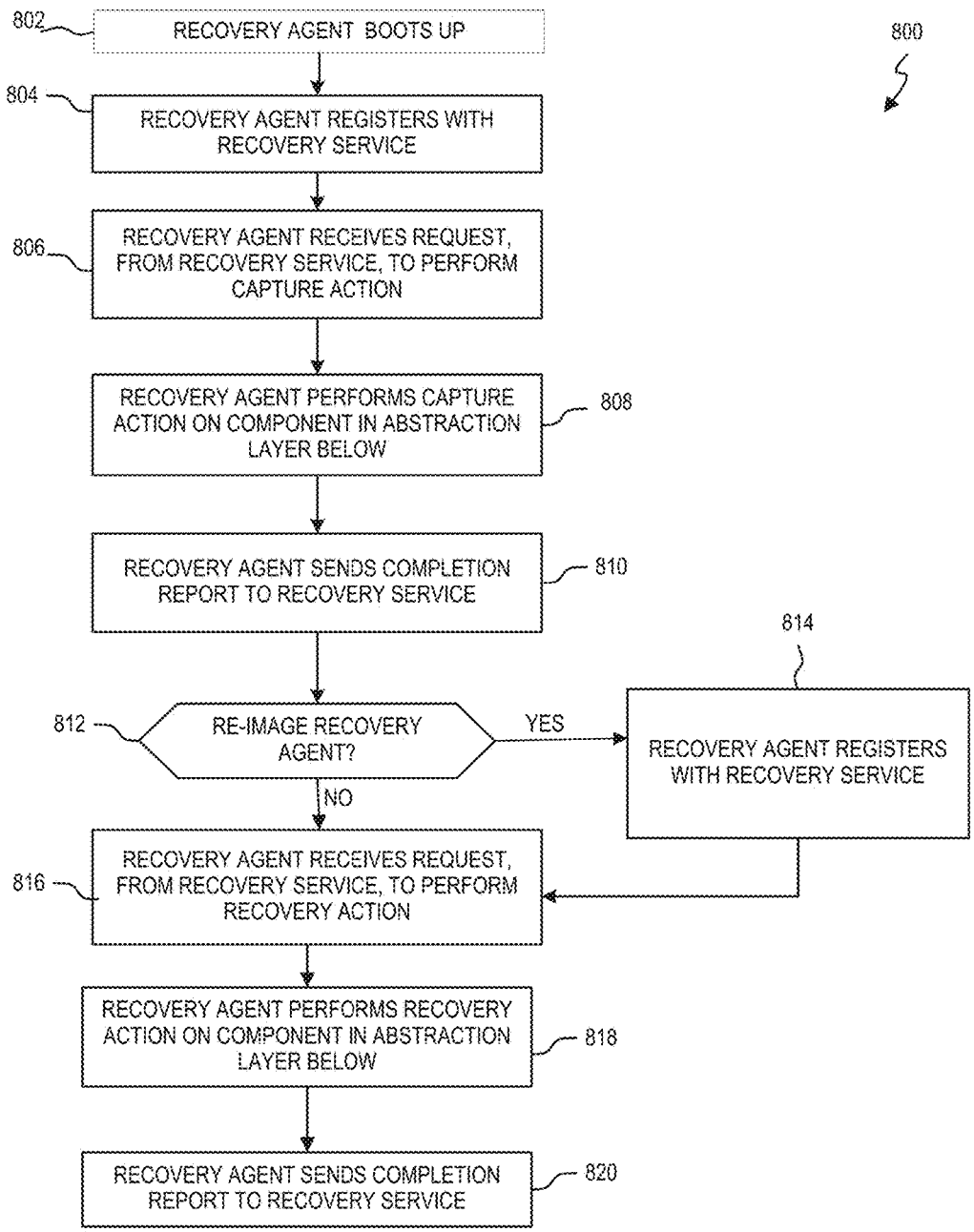
FIG. 8 is a flow diagram depicting an example method of operation of a recovery agent.

FIG. 8 is a flow diagram depicting an example method 800 of operating of a recovery agent. Method 800 may be implemented in the form of executable instructions stored on a machine readable medium and executed by a processing resource (e.g., a microcontroller, a microprocessor, central processing unit core(s), an ASIC, an FPGA, etc.) and/or in the form of electronic circuitry. For example, method 800 may be described below for illustrative purposes as being performed by a recovery agent implemented as hardware or a combination of hardware and programming, such as the recovery agent 124, 134, or 144 of the processor-based computing system 110 described above.

At block 802, the recovery agent boots up.

At block 804, the recovery agent registers with a recovery service. For example, the recovery agent may have access to a proxy or naming service though which it can locate a recovery service to interact with. Registering with a recovery service may include sending a recovery agent address information to the recovery service. Registering with the recovery service may also include informing the recovery service of a recovery agent ID of the recovery agent and/or component IDs of components which the recovery agent is associated with.

At block 806, the recovery agent receives, from the recovery service, a request to perform a capture action.

At block 808, in response to receiving the request, the recovery agent performs a capture action on a component in the abstraction layer below. For instance, if the recovery agent is installed in a physical abstraction layer, then the recovery agent may perform a capture action on a virtual machine in the virtual abstraction layer.

At block 810, after successfully performing the capture action, the recovery agent sends a completion report to the recovery service.

At block 812, a determination is made whether to re-image the recovery agent. In some examples re-imaging may be specified in the recovery script, while in other examples the recovery agent may be hard coded to automatically re-image at this point. In some examples, the operating system of the computing system may be re-booted at block 812. Upon re-boot of the operating system, the recovery agent may be re-imaged.

As the recovery agent is stateless, it may be re-imaged and may resume operation after having been re-imaged. Re-imaging the recovery agent may help to improve security, as the recovery agent may be re-imaged from a trusted golden image. A trusted golden image may for example be stored in the snapshot repository (e.g. 190) and may be cryptographically secured. In one example, a golden image of the recovery agent may be linked by a cryptographic chain of trust to a trusted lower level of the computing system operating system or firmware. For example, the recovery agent golden image may be linked by a chain of trust to a trusted platform module (TPM) or other secure location at a lower level of the computing system. In this way, it may be more likely that the re-imaged recovery agent is free from malware and in a good working state.

If the recovery agent is to be re-imaged then the method proceeds to block 814. The recovery agent is re-imaged and re-boots. The recovery agent then registers again with the recovery service. Block 814 may be analogous to block 804, which has already been described above.

At block 816, the recovery agent receives, from the recovery service, a request to perform a recovery action.

At block 818, the recovery agent performs the requested recovery action on a component in the abstraction layer below.

At block 820, the recovery agent sends a completion report to the recovery service.

While various examples of systems and methods have been described above, it is to be understood that any features of these examples may be combined with each other, unless logic dictates otherwise.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed:

1. A computing system comprising:
   a processing resource; and
   a non-transitory machine readable medium encoded with instructions that, when executed, cause the processing resource to implement:
   a plurality of abstraction layers, each layer including a number of components;
   a plurality of recovery agents, each recovery agent installed in a respective abstraction layer and associated with a component in a lower abstraction layer; and
   a recovery service to receive a recovery script from an external recovery script repository, the recovery script including a number of actions, each respective action being either a capture action to send a snapshot of a target component to an external forensic capture repository or a recovery action to return a target component to a known good state;
   wherein, for each action in the recovery script, the recovery service is to determine a recovery agent which can perform the action on the target component and request the determined recovery agent to perform the action; and
   wherein each recovery agent is to, in response to receiving a request to perform an action on a target component, perform the action on the target component,
   wherein the external forensic repository is an append-only, cryptographically secured database.

2. The computing system of claim 1, wherein the recovery script includes instructions to perform a capture action followed by a recovery action.

3. The computing system of claim 1, wherein the plurality of abstraction layers include a physical layer that includes an operating system and at least one of:
   a virtual layer that includes a virtual machine managed by a hypervisor,
   a container layer that includes a container managed by a container engine, and
   an application layer that includes an application installed on the computing system.

4. The computing system of claim 1, wherein the action performed by the recovery agent includes:
   returning an application to a pre-defined state, rebooting or re-imaging a virtual machine, operating system or container or
   rolling an operating system, hypervisor, virtual machine or container backward to a known good state or forward to a patched known good state.

5. The computing system of claim 1 wherein the known good state is to be retrieved by the recovery service from an external snapshot repository.

6. The computing system of claim 1 wherein the recovery service is to receive a plurality of recovery scripts and execute the recovery scripts in parallel, each recovery script comprising actions which are independent of actions in other recovery scripts.

7. The computing system of claim 1 wherein the recovery service is stateless.

8. The computing system of claim 1 wherein the recovery service is to capture components in a plurality of abstraction levels of the computing system and then reboot an operating system of the computing system, and subsequent to reboot of the operating system the recovery service is to instruct at least one recovery agent to recover a component of the computing system to a known good state based on a snapshot stored in an external snapshot repository.

9. The computing system of claim 1 wherein recovery agents at lower levels of abstraction are to perform capture actions before recovery agents at higher levels of abstraction.

10. The computing system of claim 1 comprising a plurality of recovery services, each recovery service being installed in a respective abstraction layer and associated with a recovery agent in the same abstraction layer or associated with a recovery agent in a lower abstraction layer.

11. A computing system comprising:
a processing resource; and
a non-transitory machine readable medium encoded with instructions that, when executed, cause the processing resource to implement:
a plurality of abstraction layers, each layer including a number of components;
a plurality of recovery agents, each recovery agent installed in a respective abstraction layer and associated with a component in a lower abstraction layer; and
a recovery service to receive a recovery script from an external recovery script repository, the recovery script including a number of actions, each respective action being either a capture action to send a snapshot of a target component to an external forensic capture repository or a recovery action to return a target component to a known good state;
wherein, for each action in the recovery script, the recovery service is to determine a recovery agent which can perform the action on the target component and request the determined recovery agent to perform the action; and
wherein each recovery agent is to, in response to receiving a request to perform an action on a target component, perform the action on the target component, wherein at least one of the recovery agent and the recovery service has a cryptographically secured chain of trust to a golden image of the computing system, and wherein the at least one of the recovery agent and the recovery service is to be re-imaged from the golden image prior to requesting or performing a recovery action.

12. The computing system of claim 11,
wherein the plurality of abstraction layers include a physical layer that includes an operating system and at least one of:
a virtual layer that includes a virtual machine managed by a hypervisor,
a container layer that includes a container managed by a container engine, and
an application layer that includes an application installed on the computing system.

13. The computing system of claim 11, wherein recovery agents at lower levels of abstraction are to perform capture actions before recovery agents at higher levels of abstraction.

14. A computing system comprising:
a processing resource; and
a non-transitory machine readable medium encoded with instructions that, when executed, cause the processing resource to implement:
a plurality of abstraction layers, each layer including a number of components;
a plurality of recovery agents, each recovery agent installed in a respective abstraction layer and associated with a component in a lower abstraction layer; and
a recovery service to receive a recovery script from an external recovery script repository, the recovery script including a number of actions, each respective action being either a capture action to send a snapshot of a target component to an external forensic capture repository or a recovery action to return a target component to a known good state;
wherein, for each action in the recovery script, the recovery service is to determine a recovery agent which can perform the action on the target component and request the determined recovery agent to perform the action; and
wherein each recovery agent is to, in response to receiving a request to perform an action on a target component, perform the action on the target component, wherein a first recovery agent is to cause an application to flush memory content of the application to disk prior to a second recovery agent capturing a snapshot of an abstraction level in which the application is installed.

15. The computing system of claim 14,
wherein the plurality of abstraction layers include a physical layer that includes an operating system and at least one of:
a virtual layer that includes a virtual machine managed by a hypervisor,
a container layer that includes a container managed by a container engine, and
an application layer that includes an application installed on the computing system.

16. The computing system of claim 14, wherein recovery agents at lower levels of abstraction are to perform capture actions before recovery agents at higher levels of abstraction.

17. A computing system comprising:
a processing resource; and
a non-transitory machine readable medium encoded with instructions that, when executed, cause the processing resource to implement:
a plurality of abstraction layers, each layer including a number of components;
a plurality of recovery agents, each recovery agent installed in a respective abstraction layer and associated with a component in a lower abstraction layer; and
a recovery service to receive a recovery script from an external recovery script repository, the recovery script including a number of actions, each respective action being either a capture action to send a snapshot of a target component to an external forensic capture repository or a recovery action to return a target component to a known good state;
wherein, for each action in the recovery script, the recovery service is to determine a recovery agent which can perform the action on the target component and request the determined recovery agent to perform the action; and
wherein each recovery agent is to, in response to receiving a request to perform an action on a target component, perform the action on the target component, wherein the recovery service is to report a result of capture actions to an external entity and to instruct processing of recovery actions from the recovery script in response to receiving confirmation from the recovery agents that the capture actions have been completed successfully or in response to a timeout.

18. The computing system of claim 17,
wherein the plurality of abstraction layers include a physical layer that includes an operating system and at least one of:
a virtual layer that includes a virtual machine managed by a hypervisor,
a container layer that includes a container managed by a container engine, and
an application layer that includes an application installed on the computing system.

19. The computing system of claim 17, wherein recovery agents at lower levels of abstraction are to perform capture actions before recovery agents at higher levels of abstraction.

* * * * *